United States Patent [19]

Lucas

[11] 4,343,707

[45] Aug. 10, 1982

[54] METHOD AND APPARATUS FOR SEPARATING OUT SOLIDS SUSPENDED IN FLOWING, PURE WATER SYSTEMS

[75] Inventor: Robert G. Lucas, Stanford, Calif.

[73] Assignee: Electric Power Research Institute, Inc., Palo Alto, Calif.

[21] Appl. No.: 129,402

[22] Filed: Mar. 10, 1980

[51] Int. Cl.³ .......................................... B01D 35/06
[52] U.S. Cl. .................................. 210/695; 210/222; 210/512.1
[58] Field of Search ........... 210/222, 223, 304, 512 R, 210/512 A, 42 S; 209/212, 213, 214, 215, 232, 223; 55/100

[56] References Cited

U.S. PATENT DOCUMENTS

| 3,170,871 | 2/1965 | Moriya | 210/222 |
|---|---|---|---|
| 3,399,134 | 8/1968 | Schouw et al. | 210/512 R |
| 3,517,821 | 6/1970 | Monson et al. | 210/512 R |
| 3,546,854 | 12/1970 | Muller | 210/512 R |
| 3,680,705 | 8/1972 | Happ et al. | 210/222 |
| 3,776,385 | 12/1973 | Maciula et al. | 210/512 R |
| 3,802,570 | 4/1974 | Dehne | 210/512 R |
| 3,807,568 | 4/1974 | Ruthrit | 210/512 R |
| 3,923,660 | 12/1975 | Kottmeier | 210/222 |
| 4,179,273 | 12/1979 | Montusi | 210/512 R |
| 4,216,095 | 8/1980 | Ruff | 210/51 RR |
| 4,219,409 | 8/1980 | Liller | 210/512 R |

Primary Examiner—Theodore A. Granger
Attorney, Agent, or Firm—Flehr, Hohbach, Test, Albritton & Herbert

[57] ABSTRACT

Method and apparatus for separating out solids suspended in flowing, substantially pure water systems such as those systems found in steam power plants. The apparatus includes a helical conduit which directs the water and suspended solids in a helical flow path that subjects the solids to a centrifugal force. The apparatus further includes magnets mounted around the helical conduit for subjecting the solids suspended in the water to a magnetic force. The magnetic force and the centrifugal force co-act to direct the suspended solids out of one of two outlet nozzles. The remaining water with the suspended solids removed flows out of the other outlet nozzle.

13 Claims, 5 Drawing Figures

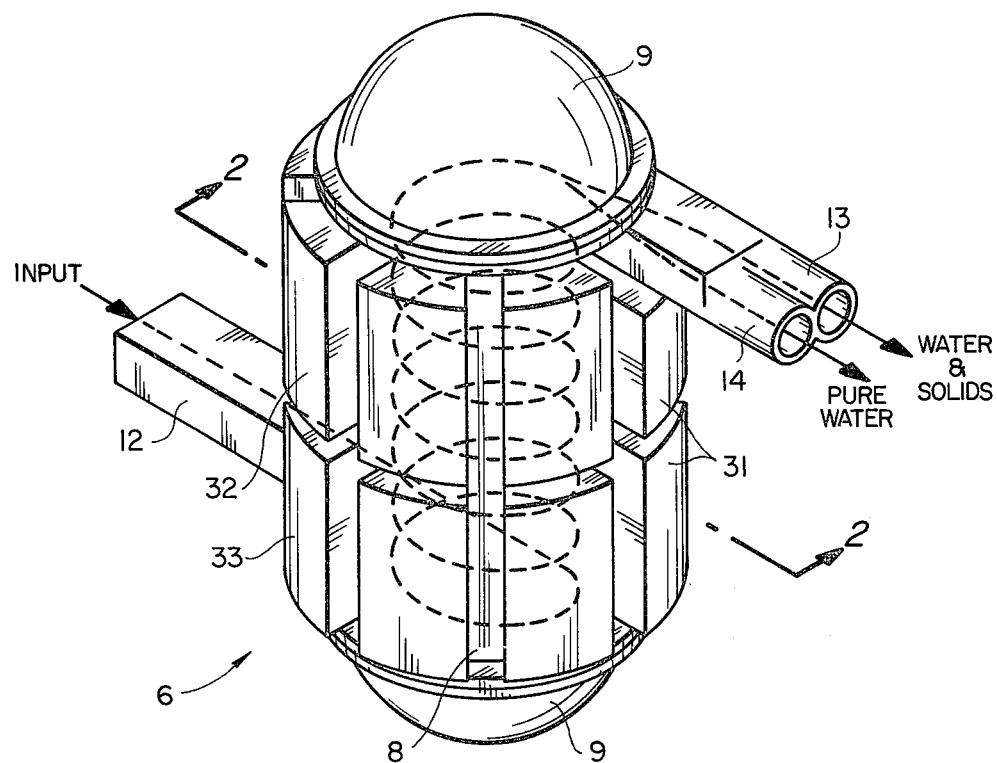
FIG_1
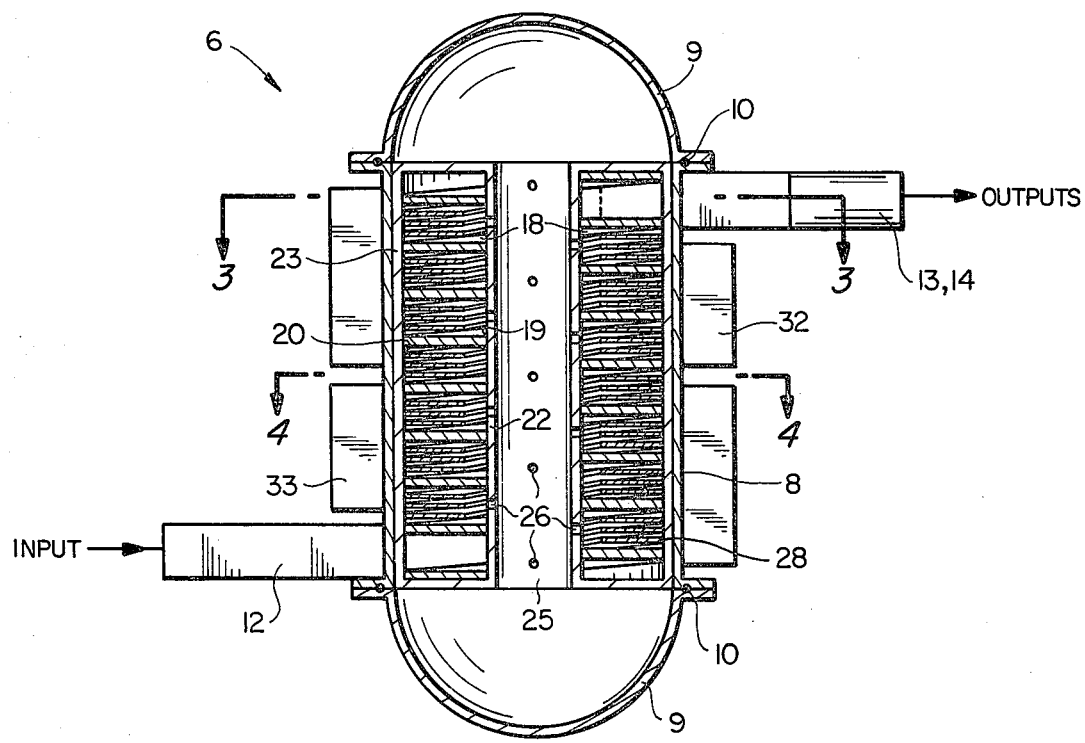
FIG_2

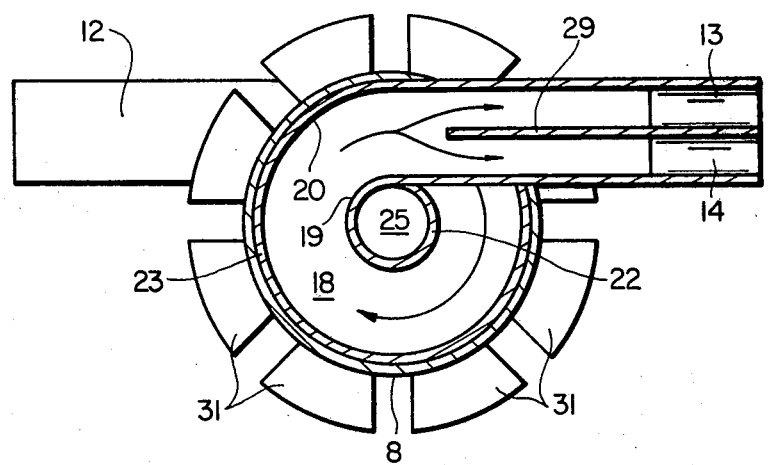
FIG_3
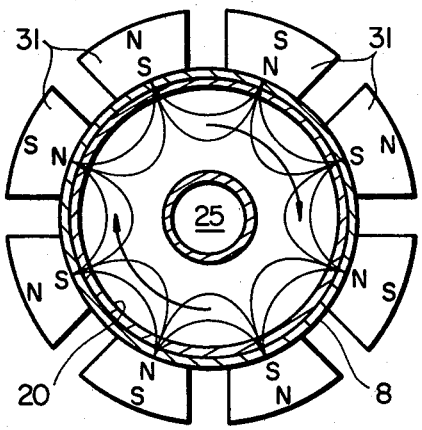
FIG_4
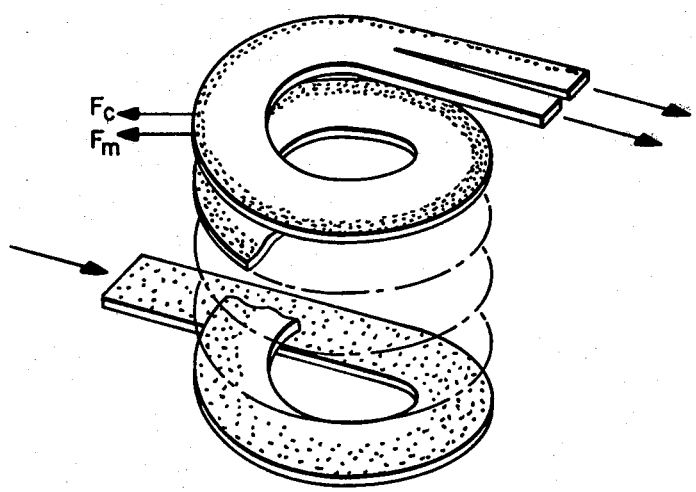
FIG_5

METHOD AND APPARATUS FOR SEPARATING OUT SOLIDS SUSPENDED IN FLOWING, PURE WATER SYSTEMS

DESCRIPTION

Technical Field

This invention relates to filters and separaters for fluid and, more particularly, to systems for separating out solids suspended in flowing, substantially pure water.

Background Art

The water used in steam generating systems must be as pure as possible. If there are any suspended solids in steam generator water, feed water and condensate, these solids collect in the steam generator or boiler as sludge. The problem with sludge deposition in the steam generator is that the sludge build-up increases with steam generator life and is extremely difficult to remove. Suspended solids can come from impure makeup water, corrosion products, and metal deposition. In addition, as the amount of sludge increases, the chemistry of the entire system becomes more difficult to maintain within specification. Further, the solids can be carried over in the steam and damage the turbines.

In nuclear power plants these suspended solids may also contribute to the problem of denting in the steam generator. Denting is a term used to describe the results of a corrosion process that occurs on the secondary side of steam generators in nuclear power plants. Corrosion products including non-protective magnetite tend to build up in the gaps between the outer surface of the inconel steam generator tubes and the surface of the carbon steel support plate. In time the deposit grows to a thickness sufficient to compress or dent the tube in the region around the tube support plate. Ultimately the corrosion products may compress against the tube sufficiently to cause it to fail.

The reduction reaction of the corrosion products of copper and nickel in nuclear steam generators provides available oxygen for the corrosion of the iron and iron alloy components in the steam generator. Presently it is believed that minimal oxygen enters the steam generator in a molecular form. Thus, the removal of corrosion products from the steam generator may alleviate the problem of steam generator tube denting.

At the present time electromagnetic filters are used to filter water in some conventional and nuclear power plants. These filters, however, are unable to efficiently remove weakly magnetic and non-magnetic particles. In most operating nuclear power plants the feed train contains varying amounts of copper and nickel alloys. These corrosion products are from metals that are very difficult to remove from the feed train by magnetic force alone. Further, even iron oxides are difficult to remove when the particles are approximately four microns in size or less. The turbulance in these filters due to the feed flow is sufficient to overcome the forces of electromagnetic entrapment on these small particles.

In addition, condensate polishers, etched filters and graphite filters are also currently used. These filters, like the electromagnetic filters, operate with only partial success. These filters separate small particles inefficiently and have large head losses at high rates of flow.

The present invention is directed to overcoming one or more of the problems set forth above.

Disclosure of the Invention

In one aspect of the present invention, an apparatus for separating out solids suspended in flowing, substantially pure water is contemplated. The apparatus comprises a conduit forming a helical flow path for the water flowing through the apparatus. This flow path subjects the solids suspended in the water to a centrifugal force. The apparatus further includes a magnet mounted around the helical flow path for subjecting the solids to a magnetic force. The centrifugal force and the magnetic force co-act to direct the suspended solids in the flowing water out of one of two outlet nozzles. The remaining water flows out of another outlet nozzle.

The present invention solves the problem of separating out solids suspended in flowing, pure water systems by subjecting these solids to both centrifugal and magnetic forces. These forces co-act in parallel to separate out both non-magnetic, magnetic and weakly magnetic particles from the water. The apparatus also utilizes the motion of strongly magnetic particles to entrap slightly magnetic and non-magnetic particles and to move these particles radially outward to the outer sidewall of the helical flow path where the centrifugal force is greater and can retain them. The apparatus operates with higher efficiency than any system presently available because it has a smaller head loss, accommodates higher rates of flow, and separates out particles in the micron size range.

This invention also overcomes the problem of separating out very small particles suspended in fast-flowing water systems. As discussed above, one problem with prior systems was that the turbulence in the apparatus overpowered the magnetic, electromagnetic and centrifugal separation forces. The apparatus disclosed herein utilizes a plurality of flow-straightening fins and nozzles that conform to the flow of water in the apparatus. This design promotes a laminar flow throughout the apparatus and allows the magnetic and centrifugal forces to act on the suspended solids.

The problem of sludge deposition, steam generator tube denting, and the degradation of feed water chemistry (high levels of suspended solids) are all met by this invention because the apparatus disclosed herein can be installed in every feed train in the power plant. The apparatus can accomodate full feed flow and the temperatures and pressures experienced in both condensate and feed systems.

BRIEF DESCRIPTION OF THE DRAWINGS

FIG. 1 is a perspective view of the apparatus according to the present invention. This figure illustrates the flow of water through the apparatus.

FIG. 2 is a side elevational view in cross-section of the apparatus of FIG. 1 taken along line 2—2 of FIG. 1.

FIG. 3 is a top plan view in cross-section of the apparatus of FIG. 2 taken along line 3—3 of FIG. 2.

FIG. 4 is a diagrammatic plan view in cross-section of the apparatus of FIG. 2 taken along line 4—4 of FIG. 2 illustrating the magnetic field formed within the apparatus.

FIG. 5 is a diagrammatic perspective view illustrating the flow of one laminate layer of water through the apparatus. This laminate layer is formed between two of the flow-straightening fins. FIG. 5 also illustrates the operation of the forces on the solids suspended in the water and separation of solids from the remainder of the water.

BEST MODE FOR CARRYING OUT THE INVENTION

FIGS. 1 and 2 illustrate an apparatus for separating out solids suspended in flowing, substantially pure water systems. The apparatus includes a pressure valve 6 which forms the pressure boundary of the apparatus and is designed to withstand both feed system temperatures and pressures. The pressure vessel includes a cylindrical center section 8 that has a flange at each end. The flanges provide a mounting surface for two hemispherical end caps 9. The end caps can be attached to the center section 8 by either a circle of bolts, welding, or a clamping ring. O-rings 10 around the flanges are used to provide a pressure-tight seal for the apparatus.

The pressure vessel 6, FIGS. 1 and 3 also includes an inlet nozzle 12 and first and second outlet nozzles 13, 14 respectively. The first outlet nozzle 13 receives the portion of the flow nearest to the outer sidewall 20, FIG. 3 of the helical conduit 18 and the second outlet nozzle 14 receives the portion of the flow nearest the inner sidewall 19 of the helical conduit. These nozzles are placed at the discharge of the conduit in spaced apart, horizontal relationship so that the solids suspended in the flowing water pass out of the first outlet nozzle 13 and the remainder of the water is directed out of the second outlet nozzle 14. In addition, the inlet and the outlet nozzles have a rectangular cross-section. This shape is used to conform to the shape of the helical flowpath, as described below, so that there are no discontinuities or turbulence producing edges presented to the flow of water. The apparatus is designed to have minimum turbulence so that the magnetic and centrifugal forces can separate out the very smallest particles. As shown in FIG. 1, once the two flows have been separated, the nozzles terminate into pipes having a circular cross-section so that the apparatus can be easily mounted in a conventional feed train.

FIG. 1 illustrates that the flow of water through the apparatus follows a helical flow path. This flow path is vertically upward and has right-handed advancing pitch. Referring to FIG. 2, this helical path is formed by a helical conduit 18 which connects between inlet nozzle 12 and the two outlet nozzles 13, 14. The helical conduit has a generally rectangular cross-section and forms a very smooth flow path without discontinuities between the nozzles. The smooth flow path is especially designed to promote laminar flow through the apparatus and to avoid turbulence. The helical conduit has an inner sidewall 19 and an outer sidewall 20. While flowing through the apparatus, the suspended solids are directed radially outward toward the outer sidewall of the conduit. The helical conduit 18, FIG. 2 is fabricated into an annular, cylindrical assembly to permit insertion and removal of the conduit from the center section 8 of the pressure vessel. The cylindrical assembly is designed so that the imput and output nozzles and the terminal ends of the conduit smoothly conform with producing flow discontinuities.

Referring to FIG. 2, the annular cylindrical assembly which comprises the entire helical conduit 18 has an inner cylindrical wall 22 and an outer cylindrical wall 23. The inner wall comprises the inner sidewalls of each overlying turn of the conduit and the outer wall comprises the sidewalls of the overlying turns of the conduit. The inner cylindrical wall 22 defines the inside of the helical flow path and ensures that the flow of fluid through the apparatus is confined to an area adjacent to the outer annular wall 23 where the suspended solids can develop high angular velocities and be subjected to a larger magnetic force. The inner cylindrical wall 22 also defines a central core area 25 where there is substantially no flow. During operation the core area and the area within the end caps 9 is filled with water and the inner cylindrical wall 22 contains a plurality of small holes 26 which equalize the pressure between the core area and the inside of the helical conduit 18. These holes eliminate any differential pressure from being generated across the inner wall 22.

The helical conduit 18, FIG. 2 contains a plurality of flow-straightening fins 28. In FIG. 2 there are three such fins in the conduit. Each fin is attached to the outer side wall 20 of the conduit so that there is a gap between the end of the fin and the inner sidewall. This gap avoids the development of differential pressures across the fins within the conduit during operation. The fins are located parallel with the flow path of the water through the apparatus and are parallel to the pitch of the helix. FIG. 5 represents the flow of one laminate layer of water formed between two fins as the layer passes through the apparatus. The purpose of the fins is to promote laminar flow of the water through the apparatus so that the magnetic and centrifugal forces can force the suspended solids radially outward against the outer sidewall of the conduit. The number of fins, their position and location are empirically determined according to each installation of the apparatus. There should be a sufficient number of fins in order to ensure the laminar flow is maintained through the conduit and yet the number should not be so large as to cause an unacceptable head loss during operation.

Referring to FIG. 3, as the suspended solids approach the end of the helical conduit, these solids are in the outer portion of the helix and are flowing proximate to the outer side wall 20. Just before the flow travels out the outlet nozzles 13, 14 there is a vertical divider plate 29 which separates the flow into two streams. The suspended solids and corrosion products which are flowing in the portion of the flow next to the outer sidewall are directed by the divider plate into the first outlet nozzle 13. The suspended solids are thereafter directed to another filtering system or the water is discarded. The remainder of the flow, which is relatively pure water, is directed by the divider plate out the second outlet nozzle 14. The second nozzle directs the pure water on to the steam generator.

Referring to FIGS. 1-4, the magnetic forces on the solids suspended in the fluid flowing through the apparatus is generated by a plurality of magnets 31 mounted around the outer sidewall of the pressure vessel 6. These magnets are located outside of the pressure boundary of the apparatus and co-act with the centrifugal force to move the suspended solids radially outward while flowing through the helical conduit. Referring to FIG. 4, the magnets are arranged around the conduit with alternating poles so that the magnetic flux is centered in the flow path of the water rather than in the core area 25. This design ensures that the magnetic field is concentrated near the outer sidewall 20 of the conduit. The apparatus including the pressure vessel 6 and the helical conduit 18 is fabricated from a material having low magnetic susceptibility. This ensures that the magnetic flux is disturbed as little as possible and that the magnetic force on the suspended solids flowing through the conduit is as strong as possible. In the preferred embodiment a stainless steel alloy having low magnetic susceptibility is used. The magnets 31 are of laminate construction and are fabricated and operate in the same manner as the stator windings in conventional electric generators. The axis of the magnetic field of each pole piece is perpendicular to the longitudinal axis of the helix.

In order to minimize the consumption of power necessary to produce the magnetic field, a plurality of magnets are used, FIGS. 2 and 3, and the magnets are distributed in rows along the helical flow path. It is believed that power consumption can further be minimized while attaining the same separation efficiency by varying the field strength of the magnets so that as the suspended solids approach the outlet nozzles, the solids are subjected to a larger magnetic force. This is achieved by placing magnets having small field strengths 33 nearer the inlet nozzle 12 and placing magnets having increasingly larger field strengths 32 nearer the outlet nozzles 13, 14. In actual practice, the field strength, the number of magnets, and their distribution around the apparatus is empirically determined because the flow rate and the concentration of solids suspended in the water varies between applications.

In operation the apparatus is installed in a steam generator feed train and is placed either in the condensate system or in the feed system on either the suction or discharge side of the feed pump. In addition, the apparatus may be used in any other filtering application in the power plant in which it is desirable to remove suspended solids from water. The apparatus is designed to accommodate full feed flow and the pressures and temperatures which accompany any conventional installation.

The water ensures the apparatus through the inlet nozzle 12, FIG. 1 and travels a helical path through the apparatus. FIG. 5 illustrates the entering flow as having a substantially even distribution of suspended solids as represented by the dots. After the inlet nozzle the flow of water undergoes a smooth transition and enters the helical conduit 18, FIG. 2, which subjects the suspended solids to a centrifugal force. Within the helical conduit the suspended solids are accelerated and travel outward in a radial direction. The suspended particles flowing through the conduit tend to flow against the outer sidewall 20 of the conduit. The apparatus maintains a laminar flow of water through the apparatus using the flow-straightening fins 28, FIG. 2 and the smooth transitions between the conduit and the nozzles. FIG. 5 illustrates a laminate layer of water as it passes through the apparatus.

Concurrently with the centrifugal force on the suspended solids, a magnetic force produced by the magnets 32, 33 acts on the solids. As illustrated in FIG. 4, the magnetic field is generally centered within the helical conduit and the magnetic force co-acts with centrifugal force in a parallel direction on the suspended solids. The magnetic force and centrifugal force together cause the magnetic and non-magnetic suspended solids to flow radially outward against the outer sidewall 20 of the helical conduit. As the solids travel through the helical flow path, the solids are subjected to an increasing magnetic field so that as the solids approach the outlet nozzles 13, 14 they are subjected to the strongest magnetic field and are under the largest force to direct them out of the first nozzle 13.

As the flow water approaches the end of the helical conduit, the flow is divided into two independent portions by the divider plate 29, FIG. 3. The portion of the flow nearest the outer sidewall 20 and containing the solids is directed out of the first outlet nozzle 13 and on another portion of the feed system for further filtering. The portion of the flow nearest the inner sidewall 19 and from which the suspended solids have been removed flows out of the second outlet nozzle 14 and on to the steam generator.

It should be understood that although the embodiment of FIG. 2 utilizes a helical flow path having a rectangular cross-section, the present invention also contemplates a helical flow path having various cross-sections. Such cross-sections include both eliptical and circular configurations. Moreover, it should be understood that although the present invention is oriented with the longitudinal axis of the helix in a vertical direction, the helix in the apparatus can be installed in other orientations. A flow path which leads vertically upwards is disclosed in this embodiment merely for the purposes of illustration.

Other aspects, objects and advantages of this invention can be obtained from the study of the drawings, the disclosure and the appended claims.

I claim:

1. Apparatus for separating out strongly magnetic, slightly magnetic and non-magnetic solids suspended in a stream of flowing, substantially pure water, comprising:
   (a) a pressure vessel having an inlet for receiving said stream and first and second outlet nozzles;
   (b) a conduit within the pressure vessel forming a helical flow path extending between and in fluid communication with said inlet and said outlets between opposing radially inner and outer side walls respectively aligned with said first and second outlet nozzles for directing said stream from said inlet to said outlets between said side walls, said helical flow path subjecting the solids suspended in the stream of water to a centrifugal force in the direction of said outer side wall;
   (c) magnet means for subjecting the solids suspended in the water flowing through the apparatus to a magnetic force; and
   (d) means for mounting said magnet means along the helical flow path so that said magnetic force causes the magnetic particles in said stream to be drawn towards said outer side wall, whereby said centrifugal force and said magnetic force co-act to direct the suspended solids in sufficiently close proximity to said outer side walls so as to pass out of said second outlet nozzle along with some of the water from said stream while the remaining water flows out of the first outlet nozzle.

2. An apparatus as in claim 1 wherein the conduit has a substantially rectangular cross-section including said inner and outer side wall and a plurality of flow-straightening fins which are parallel to the pitch of the helix and which extend from said outer side wall towards said inner side wall in parallel relationship to one another and along substantially the entire length of said path, said fins serving to promote laminar flow within the conduit.

3. An apparatus as in claim 1 wherein the helical conduit is contained within a cylindrical assembly which is removable from the pressure vessel.

4. An apparatus according to claim 2 wherein said fins stop short of the inner side wall of said conduit whereby to define a gap between said inner side wall and the adjacent ends of said fins so as to prevent differential pressures from developing across the fins.

5. An apparatus for separating out strongly magnetic, slightly magnetic and non-magnetic solids suspended in a stream of flowing, substantially pure water, comprising:
(a) a helical conduit having an inlet, an outlet, an inner side wall and an outer side wall, said conduit forming a helical flow path for passing said stream of substantially pure water flowing through the apparatus, said helical flow path subjecting solids suspended in the stream to a centrifugal force of sufficient magnitude to cause all of the suspended solids to move radially outward toward the outer side wall of the conduit while flowing therethrough;
(b) magnet means mounted around the outer side wall of the helical conduit in a way which concentrates the entire magnetic field created by said magnet means within said helical flow path closer to said outer side wall than said inner side wall for subjecting the suspended solids flowing through the conduit to a magnetic force of sufficient magnitude to cause at least said strongly magnetic solids to move radially outward toward the outer side wall of the conduit by means of magnetic force while flowing through said conduit, whereby to entrap at least some of the slightly magnetic and non-magnetic solids for moving the latter further radially outward;
(c) an inlet nozzle communicating with the helical conduit for directing the stream of substantially pure water with solids suspended therein into the helical conduit;
(d) first and second outlet nozzles communicating with the helical conduit for receiving the stream of water from the helical conduit and for dividing said stream into two independent portions, said first nozzle receiving the portion of the stream of water that is proximate to the outer sidewall of the helical conduit and which contains the solids suspended in the stream which are acted upon by the centrifugal force and the magnetic force, said second nozzle receiving the portion of the stream of water that is proximate to the inner sidewall of the helical conduit, said last named portion having substantially all of the suspended solids separated out.

6. An apparatus as in claim 5 wherein said magnet means includes a plurality of magnets mounted around the outside of the helical conduit, said plurality including magnetc located proximate to the inlet nozzle which produce a magnetic force of one magnitude and magnets located proximate to the outlet nozzles that produce a magnetic force of a second, larger magnitude.

7. An apparatus as in claim 5, wherein said helical conduit has a vertical longitudinal axis and wherein said first and second outlet nozzles are horizontally spaced apart.

8. An apparatus as in claim 5 including a vertical divider plate located in the helical conduit and connected to the first and second outlet nozzle for separating said flow into two independent portions.

9. An apparatus for separating out strongly magnetic, slightly magnetic and non-magnetic solids which might be suspended in a stream of flowing fluid, comprising: vessel means including an inlet for receiving said stream, first and second outlets spaced from one another and a continuous helical conduit extending between and in fluid communication with said inlet and both of said outlets, said conduit including an outer helical side wall extending from said inlet to said first outlet and a confronting inner helical side wall extending from said inlet to said second outlet, whereby all of the solids in said stream are subjected to centrifugal force in the direction towards said outer side wall as said stream passes along said helical path from said inlet to said outlets, thereby causing said solids to move closer to said outer side wall as they move along said path towards said outlets; magnetic means disposed in close proximity to and along the length of the outer side wall of said helical conduit for subjecting all of said solids in said flowing stream to a magnetic force in the direction of said outer side walls so as to cause at least any strongly magnetic solid therein to move closer towards the outer side wall by means of said magnetic force, whereby to entrap at least some of the slightly magnetic and non-magnetic solids therein for moving the latter closer towards said outer side wall; and means for directing into said first outlet a portion of said stream which is closer to said outer side wall than said inner side wall and which includes substantially all of said solids and for directing into said second outlet the remaining portion of said stream which is closer to said inner side wall.

10. Method for separating out strongly magnetic, slightly magnetic and non-magnetic solids suspended in a stream of flowing, substantially pure water, comprising the steps of:
(a) directing said stream from an inlet along a helical flow path having opposing radially inner and outer side walls for subjecting all of said solids suspended in said stream to a centrifugal force in the direction of said outer side wall;
(b) concurrently concentrating a magnetic field in said flow path closer to said outer side wall than said inner side wall and oriented so as to subject said solids in the flow path to a magnetic force in the direction of said outer side wall, said centrifugal force and said magnetic force co-acting on the suspended solids to cause said solids to move radially outward while flowing in the helical flow path; and
(c) at the end of said helical path, dividing the stream of the water into two independent portions, one portion including said outer side wall and including one outlet nozzle in alignment with said outer side wall so that the solids move outward by the co-acting centrifugal and magnetic forces are directed into said one outlet nozzle, the other portion including said inner side wall and a second outlet nozzle in alignment with said inner side wall so that the remainder of the flow is directed into said second outlet nozzle.

11. A method in claim 10 including the step of subjecting the suspended solids to an increasing magnetic force from a magnetic field that increases as the suspended solids approach the outlet nozzels.

12. A method as in claim 10 including the step of directing the flow of water through a helical conduit with laminaor flow maintained through the apparatus so that turbulence is substantially eliminated.

13. A method for separating strongly magnetic, slightly magnetic and non-magnetic solids suspended in a stream of flowing fluid, comprising the steps of: subjecting all of said solids suspended in said stream to a centrifugal force for directing said stream from an inlet along a helical flow path limited transversely by spaced apart inner and outer helical side walls, whereby said solid particles move closer to said outer side wall as they flow along said path; concurrently subjecting all of said solids in said flow path to a magnetic force in the direction of said outer side wall sufficient to cause at least said strongly magnetic solids to move closer towards said outer side wall as they move along said path whereby to entrap at least some of the slightly magnetic and non-magnetic solids for moving the latter closer towards said outer side wall; near the end of said helical flow path, dividing said stream of fluid into a first portion which is located closer to said outer side walls than said inner side wall and which includes substantially all of said solids and a second portion which is closer to said inner side wall and which includes substantially none of said solids; and placing separate outlet nozzles in alignment with said inner and outer side walls, respectively, so as to direct said first and second stream portions into separate outlets, respectively.

* * * * *